US007324905B2

(12) United States Patent
Droubie et al.

(10) Patent No.: US 7,324,905 B2
(45) Date of Patent: Jan. 29, 2008

(54) APPARATUS, SYSTEM AND METHOD FOR AUTOMATING AN INTERACTIVE INSPECTION PROCESS

(76) Inventors: Robert James Droubie, 506 Palm Dr., Largo, FL (US) 33770; Gary Steven Kaplan, 6609 Country Club Rd., Wesley Chapel, FL (US) 33455

( * ) Notice: Subject to any disclaimer, the term of this patent is extended or adjusted under 35 U.S.C. 154(b) by 113 days.

(21) Appl. No.: 11/127,625

(22) Filed: May 11, 2005

(65) Prior Publication Data

US 2006/0259471 A1 Nov. 16, 2006

(51) Int. Cl.
*G06F 19/00* (2006.01)
*G06F 17/30* (2006.01)

(52) U.S. Cl. .............................. 702/82; 702/84; 707/3

(58) Field of Classification Search .................. 702/81, 702/82, 83, 84, 182, 186, 188; 700/28, 32, 700/108, 109, 216; 707/3; 382/141
See application file for complete search history.

(56) References Cited

U.S. PATENT DOCUMENTS 4,984,184 A 1/1991 Kurita et al. .......... 364/551.01
5,321,629 A 6/1994 Shirata et al. ......... 364/551.01
5,555,504 A * 9/1996 Lepper et al. .............. 700/115
5,900,801 A 5/1999 Heagle et al. ......... 340/286.09
5,939,974 A 8/1999 Heagle et al. ......... 340/286.09
5,956,658 A 9/1999 McMahon ................... 702/83
6,266,436 B1 * 7/2001 Bett et al. .................... 382/141
6,522,939 B1 * 2/2003 Strauch et al. .............. 700/116
6,577,969 B2 6/2003 Takeda et al. ................ 702/81
6,725,180 B2 4/2004 Mayer et al. ............... 702/188
6,811,305 B2 11/2004 Laycock ..................... 374/102
6,817,757 B1 11/2004 Wallace ...................... 374/120
2003/0202558 A1 10/2003 Chung et al. ............... 374/155

FOREIGN PATENT DOCUMENTS

JP 2003076415 A 3/2003
JP 2003248731 A 9/2003

OTHER PUBLICATIONS

"Steton Quality Suite"; http://www.steton.com/products/qualitysuite.html, 2 pages.
"Method Comparison"; http://www.steton.com/products/method.html, 3 pages.
"Enterprise Quality and Safety Systems"; http://www.steton.com/products/overview.html, 1 page.

* cited by examiner

*Primary Examiner*—Bryan Bui
(74) *Attorney, Agent, or Firm*—Kunzler & McKenzie

(57) ABSTRACT

An apparatus, system and method to automate an interactive quality control inspection process. The apparatus may query a user for a response to an audit question integral to a quality control inspection process, such as, for example, a regulatory compliance question or a standard operating procedures question. The apparatus may determine, based on the response, compliance with predetermined quality control criteria. To maximize data security and privacy, the response and/or the predetermined quality control criteria may be stored in a storage device under the exclusive control of the user, and access to such information may be restricted to authorized users according to access rights. Further, the apparatus may facilitate quality and safety assurance by conditioning continuation of the quality control inspection process on completion of a corrective action where the response fails to comply with the predetermined quality control criteria.

24 Claims, 7 Drawing Sheets

APPARATUS, SYSTEM AND METHOD FOR AUTOMATING AN INTERACTIVE INSPECTION PROCESS

BACKGROUND OF THE INVENTION

1. Field of the Invention

This invention relates to interactive inspection processes, and more particularly relates to an interactive inspection process for identifying, evaluating and controlling industry hazards.

2. Description of the Related Art

Safety and quality assurance is vital to the success of any business, and particularly important to food service industries, where food borne hazards are estimated to cause approximately 76 million illnesses, 325,000 hospitalizations, and 5,000 deaths in the United States each year. The enormity of the food service industry, coupled with the diversity of food products and methods for food processing present unique challenges to food safety and quality assurance programs. Moreover, food borne hazards are inherently elusive as new food pathogens continue to emerge and unrecognized food pathogens become more widespread.

To reduce the prevalence of food borne disease, the Food and Drug Administration ("FDA") recently requested that food service industries comply with standardized principles incorporated into the Food Code that systematically identify, evaluate and control food safety hazards "from the farm to the table." Specifically, these principles, known as Hazard Analysis and Critical Control Point ("HACCP") principles, focus on preventing food borne hazards, such as microbial contamination, by identifying points at which hazardous materials can be introduced into food, and then by monitoring these potential problem areas and immediately correcting problems that arise.

HACCP is a seven-step process, including (1) conducting a hazard analysis; (2) establishing critical control points; (3) establishing critical limits; (4) establishing monitoring procedures; (5) establishing corrective action; (6) verification; and (7) recordkeeping. In operation, a HACCP-based program may proceed as follows. First, a hazard analysis may be conducted to collect and evaluate information to identify potential hazards. Critical control points, or points where conditions can be controlled to prevent, eliminate or reduce their hazardous potential, may then be established and critical limits defined.

Critical limits define parameters within which the condition may be considered controlled. For example, a critical limit may correspond to a maximum temperature of a refrigerated unit. If a temperature gauge on the refrigerated unit reflects a temperature that exceeds the critical limit, the condition may be deemed outside the bounds of control, and thus assumed hazardous.

To ensure an identified potentially hazardous condition is maintained within the established critical limits, the condition may be monitored according to established monitoring procedures. Where monitoring procedures indicate that a hazardous condition exists, an appropriate established corrective action may be implemented. Verification procedures may be established to verify that the corrective action has been implemented where required, and that all other principles are adequately followed. Finally, recordkeeping procedures may be implemented to enable continuous evaluation of an industry's performance history to facilitate a foundational program that provides the basic environmental and operating conditions necessary to prevent food safety hazards.

As federal regulations now mandate application of HACCP principles in addition to Occupational Safety and Health Administration ("OSHA") and other food safety and quality assurance requirements applicable to food service industries, many such industries conduct internal inspection processes as a matter of routine to ensure federal compliance prior to federal inspection. Further, many food service establishments independently adopt standard operating procedures and policies to enhance the establishment's ability to assure safety and quality, as well as to ensure compliance with franchise operating procedures, as applicable. Such establishments thus rely on quick and accurate inspection processes to ensure regulatory and standard operating procedure compliance without compromising their efficiency.

Failure to meet regulatory and standard operating procedure mandates may have deleterious effects, including, in some cases, forced closure of a food service establishment. A negative self-audit may imbue similar results where the audit is inadvertently released to the public and the associated food service establishment is thereby subjected to social condemnation. To avoid this result, the integrity and security of data obtained from a self-audit or even a regulatory audit is of the utmost importance. Similarly, standard operating procedure mandates may include trade secrets exclusive to a particular food service establishment, thereby necessitating the highest degree of data security and privacy of audit criteria as well as audit results.

Accordingly, a need exists for an automated interactive inspection process that facilitates a quick and accurate assessment of regulatory and standard operating procedure compliance while ensuring data security and privacy. Beneficially, such an automated interactive inspection process would provide automated presentation of audit questions relevant to regulatory and standard operating procedure mandates, provide immediate results of sanitary inspection and testing procedures, require immediate correction of a condition that does not comply with applicable mandates and/or predetermined quality control criteria, and maintain the audit results and/or audit criteria in a manner accessible exclusively to authorized users. Such an automated interactive inspection process is disclosed and claimed herein.

SUMMARY OF THE INVENTION

The present invention has been developed in response to the present state of the art, and in particular, in response to the problems and needs in the art that have not yet been fully solved by currently available quality control inspection processes. Accordingly, the present invention has been developed to provide an automated interactive quality control inspection process that overcomes many or all of the above-discussed shortcomings in the art.

An apparatus to automate an interactive quality control inspection process in accordance with certain embodiments of the present invention includes a processor and a memory device storing executable and operational data including a query module, a storage module, a determination module, and an access control module. The query module may be configured to query a user for a response to at least one audit question integral to a quality control inspection process, such as, for example, a regulatory compliance question or a standard operating procedures question. In some embodiments, the audit question may be dynamically modified in response to administrator input. In other embodiments, a sanitation module may be provided to detect and analyze biological material and other sanitary conditions to generate the response.

The storage module may be configured to store the response in a storage device under the exclusive control of the user, thereby ensuring data integrity. The determination module may then use the response to determine compliance with predetermined quality control criteria, while an access control module further maximizes data security and privacy by restricting access to the response and/or predetermined quality control criteria to authorized users according to their access rights. In addition, data security and privacy is further ensured by storing the data on a storage device under the exclusive control of the user. In certain embodiments, the predetermined quality control criteria may be selectively modified to reflect updated quality control criteria.

In some embodiments, the present invention may provide a correction module configured to require a corrective action where the response does not comply with the predetermined quality control criteria, and to selectively query the user for a response to a next audit question in response to completion of the corrective action. In other embodiments, the present invention may include an education module configured to present training information to the user with respect to the audit question, the predetermined quality control criteria, and/or the corrective action. The present invention may further include a reporting module configured to rate the response and to cumulate a plurality of ratings to assess overall compliance with the predetermined quality control criteria. Finally, in certain embodiments, the invention may include a termination module to terminate the interactive quality control inspection process where the response repeatedly fails to comply with the predetermined quality control criteria for a predetermined number of audit questions.

A system of the present invention is also presented to provide an automated interactive quality control inspection process. The system may be embodied by a sanitation device in communication with a portable audit device. The sanitation device may be adapted to detect and analyze biological material and other sanitary conditions to generate information that may be communicated to the portable audit device. The portable audit device may store a query module configured to query a user for a response to at least one audit question, where the response includes the information generated by the sanitation device. The query may include a regulatory compliance question and/or a standard operating procedures question.

As in the apparatus, the portable audit device may further include a storage module, a determination module, and an access control module. The storage module may be configured to store the response in a storage device under the exclusive control of the user, while the determination module may be configured to determine, based on the response, compliance with predetermined quality control criteria. The access control module may be configured to restrict access to the response and/or the predetermined quality control criteria to authorized users according to access rights.

In certain embodiments, the portable audit device may further provide a correction module, a reporting module, a termination module, and/or an education module. The correction module may require a corrective action where the response does not comply with the predetermined quality control criteria, and may selectively query the user for a response to the next audit question in response to completion of the corrective action. The reporting module may rate the response and cumulate a plurality of ratings to assess overall compliance with the predetermined quality control criteria. The termination may terminate the interactive quality control inspection process where the response repeatedly fails to comply with the predetermined quality control criteria for a predetermined number of audit questions. Finally, the education module may present training information to the user with respect to the audit question, the predetermined quality control criteria, and/or the corrective action.

A method of the present invention is also presented for automating an interactive quality control inspection process. In one embodiment, the method includes querying a user for a response to an audit question and storing the response in a storage device under the exclusive control of the user. The method may further include determining, based on the response, compliance with predetermined quality control criteria, and restricting access to the response and/or the predetermined quality control criteria to authorized users according to access rights.

In some embodiments, the method may further include requiring a corrective action where the response does not comply with the predetermined quality control criteria and selectively querying the user for a response to a next audit question in response to completion of the corrective action. In other embodiments, the method may include analyzing, via a sanitation device, biological material and other sanitary conditions to generate the response. Further, in certain embodiments, the method may include rating the response and cumulating a plurality of ratings to assess overall compliance with the predetermined quality control criteria. In other embodiments, the method may include terminating the interactive quality control inspection process where the response repeatedly fails to comply with the predetermined quality control criteria for a predetermined number of audit questions, and/or presenting training information to the user with respect to the audit question, the predetermined quality control criteria, and/or the corrective action.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
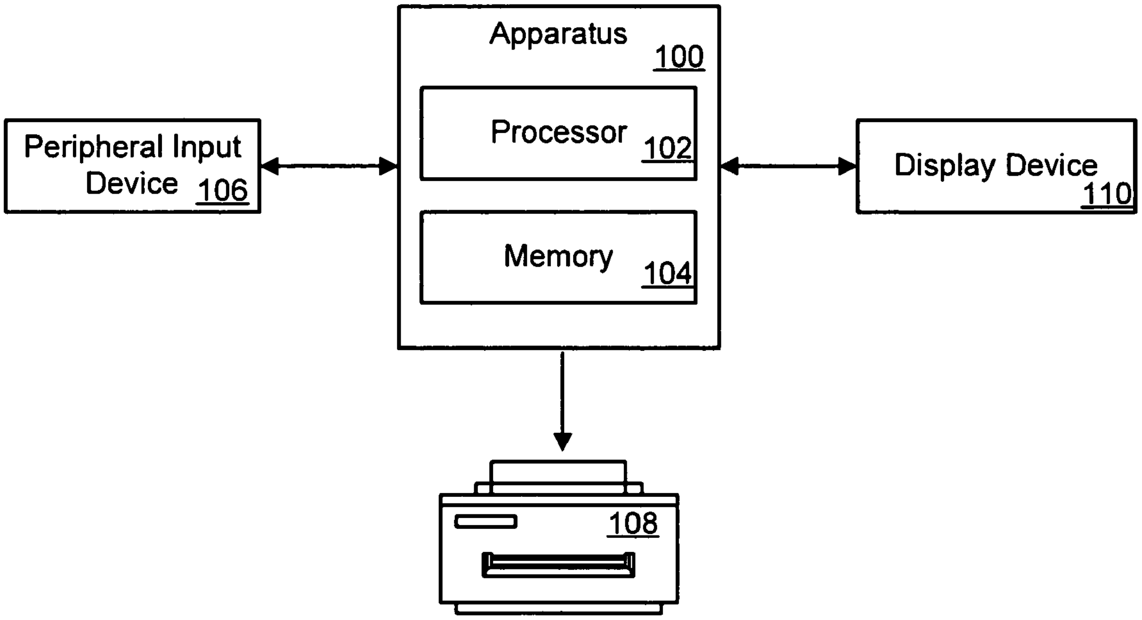
FIG. 1 is a schematic block diagram illustrating components of a system for automating an interactive inspection process in accordance with certain embodiments of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

As used in this specification, the term "interactive inspection process" refers to an inspection process that guides or prompts an inspector or other authorized user to input a response in answer to an audit question. The term "inspection process" includes any inspection process used to identify, evaluate, and/or correct certain environmental and/or behavioral conditions pertinent to the safety and quality concerns of a particular industry. The term "industry" is broadly used herein to refer to any department, branch or enterprise that provides goods or services to a customer.

Referring now to FIG. 1, a system for automating an interactive inspection process in accordance with the present invention may generally include an apparatus 100 having a processor 102 and memory device 104 storing executable and operational data. The apparatus 100 may comprise a portable audit device that may be easily transported from location to location by a user, as discussed in more detail below. Further, in some embodiments, the portable audit device may stand alone to facilitate use in various environments and transportability between environments. This feature may enable a user to conduct and store successive inspections in various locations and/or multiple inspections in the same location, all without requiring an internet or other connection to a central server.

In certain embodiments, the apparatus 100 may communicate with an update server (not shown) to dynamically update the data on a periodic or as needed basis via a short distance wired or wireless connection (not shown) such as a cable, a cradle, Bluetooth®, or other short distance connection known to those in the art. In this manner, the upload server may initially load data onto the apparatus 100, including audit questions, compliance criteria, and other information pertinent to a particular industry. Likewise, the upload server may provide customized updates to the apparatus 100 as appropriate.

Advantageously, in certain embodiments, the short distance connection between the apparatus 100 and the update server may limit a communication distance between the two to a range between about five inches and about eighty-four inches. In contrast to an internet or other network connection that exposes the data to a variety of data security and privacy threats, the short distance connection of the present invention allows the user to ensure that the data remains under the exclusive and personal control of the user without requiring expensive, complicated, and inconvenient data encryption and/or other data security controls. Further, in certain embodiments, communication between the update server and the apparatus 100 may be limited to one-way communication permitting, for example, software updates and audit question updates to travel from the update server to the apparatus 100, while preventing transmission of sensitive data from the apparatus 100 to the update server. In other embodiments, responses to audit questions may only be stored on the apparatus 100 and uploaded to another computing device via a secure short distance connection such as a desktop computer. In this manner, the apparatus 100 more effectively preserves the integrity of audit results and certain predetermined quality control criteria used to generate such results.

In some embodiments, the apparatus 100 may include, for example, a personal digital assistant ("PDA"), a tablet computer, a notebook computer, a cellular telephone, or any other portable device known to those in the art. In one embodiment, the apparatus 100 comprises a walk around inspection checklist where responses provided in answer to audit questions may be stored locally on the apparatus 100 as the inspection proceeds. Alternatively, the checklist may be in hardcopy format such as a paper. The responses may then be entered on the apparatus 100 after the inspection is completed. Typically, the apparatus 100 includes a user input device such as a keypad, touch screen, mouse, or the like and a display device. In certain embodiments, the apparatus 100 may communicate with a peripheral input device 106 such as a sensor, a thermometer, a touch pad, a scale, a keyboard, a mouse, a timer, or other such device known to those in the art capable of gathering data to generate a response in answer to an audit question. In one embodiment, the apparatus 100 is a general purpose computing device configured using software to perform the operations of the present invention. The general purpose computing device may include standard ports for connecting to the various peripheral input devices 106. The standard ports may comprise one or more Universal Serial Bus (USB) ports, infrared ports, or other wired or wireless communication ports.

Figure 5:
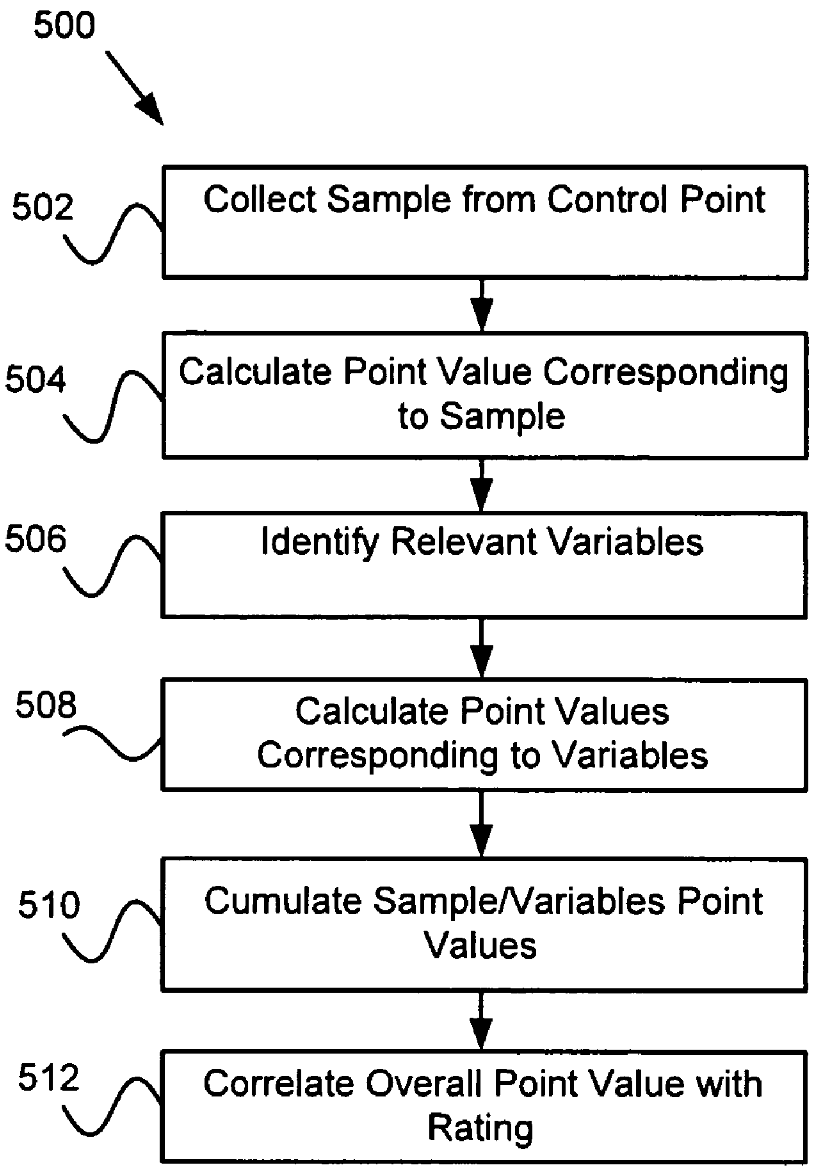
FIG. 5 is a flow chart diagram illustrating one embodiment of a method for determining a facility's performance by completing the facility performance audit in accordance with certain embodiments of the present invention.

In one embodiment, as discussed in more detail with reference to FIG. 5 below, a peripheral input device 106 may include a sanitation device capable of detecting and measuring the presence or absence of certain biological material and other sanitary conditions. Further, in some embodiments, the apparatus 100 may communicate with a printer 108 or other output device including, in some embodiments, a large display device 110 to provide audit results to an authorized user.

Figure 2:
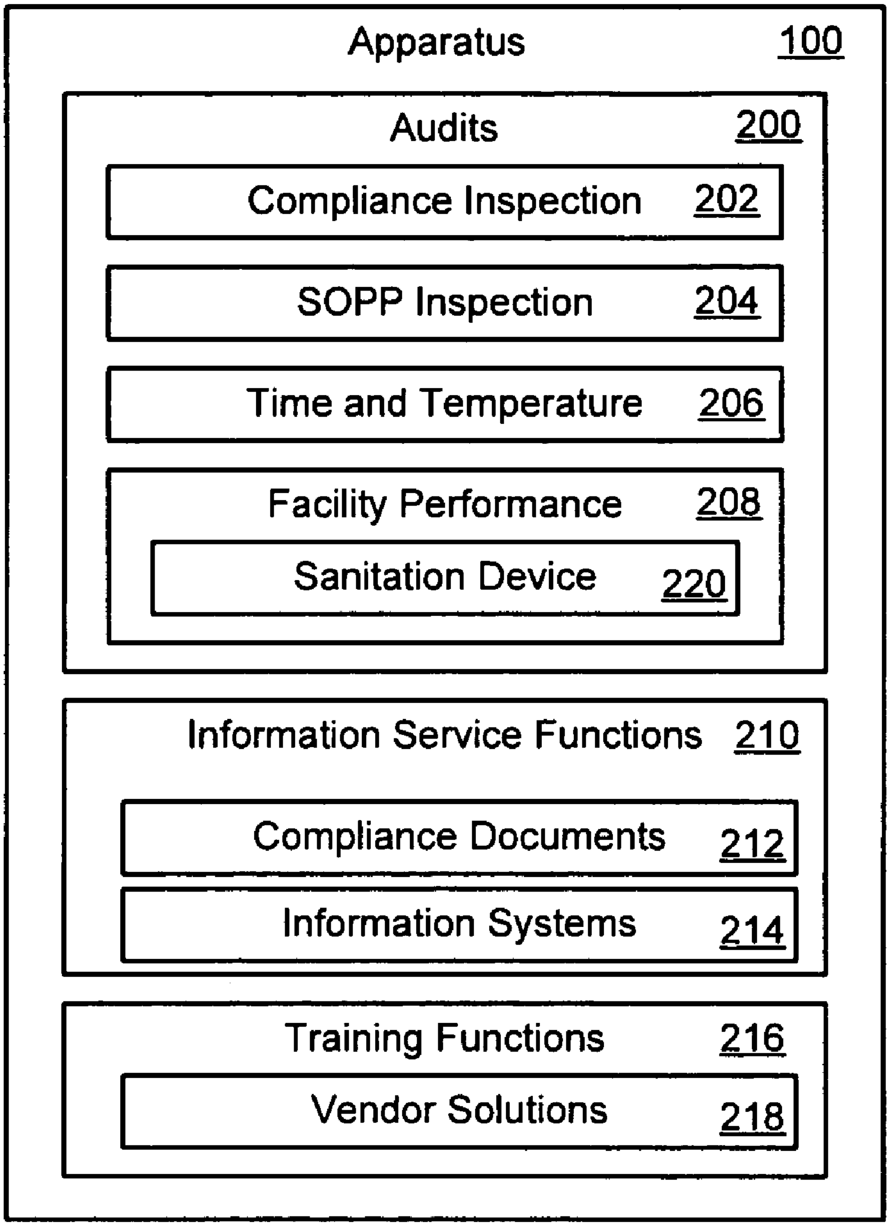
FIG. 2 is a high-level block diagram of one embodiment of the portable audit device of FIG. 1.

Referring now to FIG. 2, apparatus 100 may be adapted to provide any of various inspection-related functions. The apparatus 100 may be adapted to perform an audit 200 including, for example, a compliance inspection function 202, a standard operating policies and procedures ("SOPP") inspection function 204, a time and temperature inspection function 206, and a facility performance function 208.

Further, in certain embodiments, the apparatus 100 may include information service functions 210 such as a compliance documents function 212 and/or an information systems function 214. Finally, in some embodiments, the apparatus 100 may include training functions 216 such as a vendor solutions function 218. An authorized user may select a specific function from a list of functions displayed by a graphical user interface integral to the apparatus 100. Each function may automatically input a corresponding time and date to ensure audit 200 authenticity.

Figure 3:
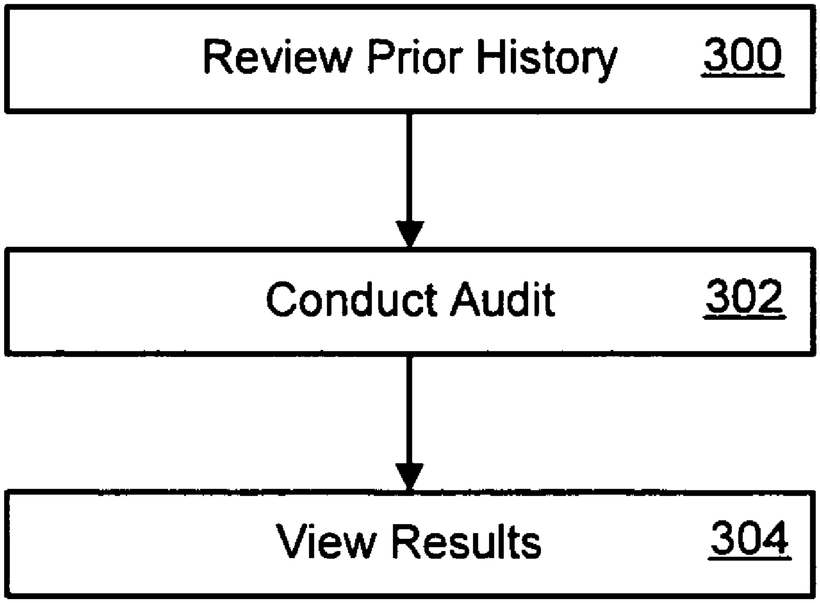
FIG. 3 is flow chart diagram illustrating one embodiment of an operational sequence for automating an interactive inspection process in accordance with the present invention.

In operation, each audit 200 generally follows the same operational sequence. As illustrated in FIG. 3 and as discussed in more detail below, an authorized user may selectively review 300 a performance history based on prior audits, conduct a present audit 302, and view 304 present audit results. While the operational processes for each audit 200 may be virtually identical, the audit questions presented and the compliance criteria used to determine compliance varies depending on the particular audit 200. The compliance inspection function 202 (See FIG. 2), for example, generally presents audit questions relevant to regulatory compliance. Specifically, the compliance inspection function 202 may present Hazard Analysis Critical Control Point ("HACCP") related audit questions, or other audit questions pertinent to determining regulatory compliance. In one embodiment, for example, an audit question may ask the user to indicate whether a thermometer installed in a refrigerator is properly working.

The SOPP inspection function 204, on the other hand, may present audit questions relevant to determining compliance with internally mandated standard operating procedures and policies, such as questions relating to operating the business, performing maintenance procedures, evaluating employee performance, sanitation, fire and safety, receiving, storage, pest control, disposal, grounds upkeep, product rotation, and the like. In certain embodiments, audit questions included in the SOPP inspection function 204 may further include questions relating to management operations such as employee discipline, sickness, new employee training, OSHA matters, general employee records, and/or other such management operation information known to those in the art. An SOPP audit question, for example, may ask the user to enter the average wait time a customer must wait for a particular employee, based on ten customers' wait times.

In any case, an audit question generally consists of a question posed to the user to obtain information pertinent to the particular audit 200. The audit question may include any or all of the following, or any other feature known to those in the art: a prior history indicator that indicates the number of times the particular audit question has been answered negatively in a specified amount of time, for example, during the last twelve months; the content of the question itself; a box or other option to indicate a negative response; a corrective action required in case of a negative response; a box or other option to acknowledge that the corrective action was taken; space for an explanation or other memorandum; and/or a rating or point value associated with the response. A corrective action may include, for example, replacing a broken thermometer where a response to the audit question indicates that a particular thermometer is not working.

Each audit question may correspond to predetermined quality control criteria previously entered or uploaded to the apparatus 100. The predetermined quality control criteria may be compared to a response to the audit question to determine compliance with a particular regulation, procedure or policy relevant to the audit 200. For example, a quality control criteria may require chicken to be held in cold storage with a temperature between thirty-two and thirty-five degrees Fahrenheit. The response may indicate that the chicken cold storage container has a temperature of thirty-three degrees, therefore the response is in compliance. In certain embodiments, audit questions may be categorized as critical or non-critical, depending on their relative significance in determining overall compliance with the particular audit 200. These categories may be used for reporting purposes, as discussed in more detail with reference to FIG. 7 below.

In addition to content variance in audit questions, associated predetermined quality control criteria and corrective actions required by the compliance 202 and SOPP 204 inspection functions, data security considerations fundamentally differ as applied to either function. Particularly, as the compliance inspection function 202 is used to ascertain industry compliance with publicly known regulatory requirements, data security is particularly relevant with respect to responses to compliance inspection function 202 audit questions. The SOPP inspection function 204, on the other hand, may determine compliance with an industry or corporation's self-imposed, often proprietary standards of operation. Given the inherently sensitive nature of the criteria used to make such a determination, such quality control criteria may be afforded a level of security comparable to the responses provided in answer to audit questions.

In one embodiment, the security measures are adjusted to effectively balance security and efficiency considerations depending upon the particular audit 200 being performed. In certain embodiments, authorized users may configure the security settings to establish a user defined balance. The predetermined quality control criteria and/or the associated audit questions corresponding to the compliance inspection function 202 may, for example, be downloaded from the update server when needed, or on a periodic basis, without risk of jeopardizing more sensitive information, such as the responses provided in answer to such audit questions and/or proprietary information relevant to the SOPP inspection function 204.

To avoid a potential security breach during data transit, however, SOPP inspection function criteria may be entered locally by an authorized user and selectively modified as needed in the same manner. In both cases, a storage device (not shown) under the exclusive control of the inspector or other authorized user may be used to store the responses as well as the predetermined quality control criteria to protect such information from unauthorized access or corruption. In some cases, the storage device may be local to the apparatus 100 such that access to sensitive information is thereby physically restricted to a user in possession of the apparatus 100. Further, in certain embodiments, access to sensitive information may be further restricted by virtue of an access control module 416, as discussed in more detail with reference to FIG. 4 below.

The time and temperature function 206 and the facility performance function 208 audit questions and associated predetermined quality control criteria may comprise less sensitive information such that security requirements are more relaxed. Even so, certain security measures may be implemented to protect certain sensitive information, such as the responses provided in answer to audit questions and specific proprietary criteria. One example of specific proprietary criteria may be the baking time for biscuits sold by a national franchise. This baking time may be considered a trade secret having high confidential value. Further, the time and temperature function 206, like each other audit 200, may require secure and automated input of the time and date that the audit 200 takes place, thereby ensuring audit authenticity. The time and temperature function 206 may communicate with a peripheral input device 106 to determine the current temperature or an average temperature over a time period.

The time and temperature function 206 may include audit questions based on standard governmental testing requirements. The questions may be categorized according to a relevant process stage to facilitate quick and accurate responses. Categories applicable to a food service establishment may include, for example, "Cold Holding," "Cooking," "Reheating," "Hot Holding," "Cooling," "Receiving," and "Freezing." The time and temperature function 206 may communicate with a peripheral input device 106 such as a thermometer, a clock, or other input device known to those in the art, to efficiently and accurately generate a response to each audit question. Further, in some embodiments, certain time and temperature audit questions may require a corrective action where the response does not comply with predetermined quality control criteria, as discussed in more detail with reference to FIG. 4 below. In certain embodiments, the time and temperature function 206 may also enable the user to enter a memo or attach a digital photograph corresponding to a particular question and response. As in the other audits 200, the criteria for the time and temperature function 206 may be dynamically updated over a secure connection to an update server to ensure audit results are based on current governmental and/or SOPP standards The facility performance function 208 may detect and measure the presence of biological material and/or other sanitary conditions to assess cleanliness. Cleanliness assessments, for example, may be taken of surfaces, food products, and food handlers' skin or clothing. The facility performance function 208 may communicate with a peripheral input device 106 such as a sanitation device 220 adapted to detect the presence of Adenosine Tri-Phosphate ("ATP"), the universal energy molecule in biological systems. The facility performance function 208 may evaluate surface cleanliness by taking into account the amount of ATP detected by the sanitation device 220, as well as certain other environmental variables.

Specifically, as discussed in more detail with reference to FIG. 5 below, the facility performance function 208 may be configured to present a series of audit questions to a user to facilitate a quick and accurate biological material and other sanitary conditions and other sanitary condition detection process capable of generating useful, reliable results. In some embodiments, an audit question may correspond to a particular test location. The user may use the sanitation device 220 to obtain a sample corresponding to the test location, and may provide responses to other questions concerning other conditions corresponding to the same location. Where the sanitation device 220 detects the presence of ATP, the facility performance function 208 may then cumulate the ATP results and the responses regarding other conditions of the same location to provide a useful, reliable assessment of surface hygiene.

The results of the facility performance 208 assessment, as well as the responses provided in answer to audit questions and the criteria used to determine compliance with predetermined surface cleanliness standards, may be stored in a storage device under the exclusive control of the user to ensure data security and integrity. Further, in some embodiments, an access control module 416 may further restrict access to sensitive information, as discussed in more detail with reference to FIG. 4 below.

As previously mentioned, an apparatus 100 in accordance with the present invention may further include information service functions 216 to enable an authorized user to access information provided by regulatory agencies and/or developed by the particular industry that is relevant to inspection and/or compliance processes. Specifically, the information service functions 216 may include a compliance documents function 208 and/or an information systems function 210. The compliance documents function 208 may include local, state, and federal compliance documents such as the Food Code and local Health Department Codes. Such documents may be available to the authorized user on a read-only or print-only basis to prevent unauthorized and/or unintentional document alteration. Further, in some embodiments, such documents may be dynamically updated over a network and/or by virtue of periodic scheduled downloads to facilitate access to documents that reflect current governmental standards. The compliance documents function 212 provides quick electronic access to these codes and regulations to ensure a facility properly complies.

The information systems function 210 may include documents created by and/or pertinent to the particular industry, corporation, or franchise, including, for example, documents concerning industry marketing, education and training, federal and state industry forms, signs, promotional material, and the like. In one embodiment, for example, the information systems function 210 may include a recently distributed circular containing redeemable coupons. Such documents may be dynamically updated from an update server and/or by virtue of periodic scheduled downloads. Preferably, to preserve data stored on the apparatus 100, the downloads and updates transfer data exclusively from the update server to the apparatus 100 and no sensitive data such as responses, control criteria, and certain audit questions travel to the apparatus 100. Further, an authorized user may view, print and/or save such documents to a storage device.

Finally, an apparatus 100 in accordance with the present invention may include training functions 216 such as a vendor solutions function 218. The vendor solutions function 216 may provide documents, illustrations, photographs, web page links, and other informational material pertinent to quality and safety assurance. In one embodiment, for example, the vendor solutions function 218 includes a manual illustrating proper oven cleaning techniques. As in the information systems function 210, informational material integral to the vendor solutions function 218 may be dynamically updated from an update server and/or by virtue of periodic scheduled downloads, and an authorized user may view, print and/or save any of such materials to a storage device.

Referring now to FIG. 3, and as mentioned above, each audit 200 generally follows the same operational sequence: optionally review a performance history based on prior audits 300; conduct a present audit 302; and view present audit results 304. An authorized user may customize a review of the performance history 300 by selecting certain data fields to display, and/or by sorting the data displayed by the data fields. Data fields may include, for example, prior history ratings including prior compliance violations and the severity of such violations, prior items evaluated, prior corrective action taken, and the like. The information obtained by a review of the performance history 300 may facilitate effective implementation of quality and safety assurance protocols customized to a particular industry.

Following review of the performance history 300, and as discussed in more detail with reference to FIG. 4 below, an authorized user may conduct a present audit 302 as provided by an audit 200 predefined by the present invention. The results of such an audit may then be viewed by the authorized user 304 and used to assess present compliance and identify problem areas.

Figure 4:
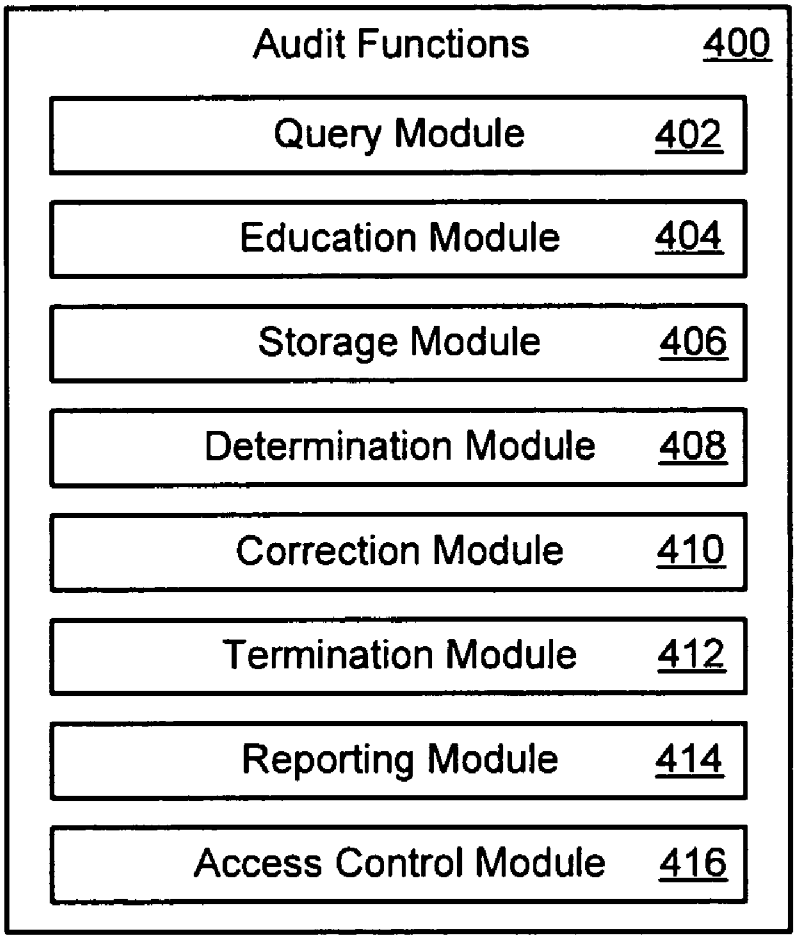
FIG. 4 is a high-level block diagram of an apparatus for automating an interactive inspection process in accordance with certain embodiments of the present invention.

Referring now to FIG. 4, audits 200 in accordance with certain embodiments of the present invention may incorporate any of several functional modules that cooperate to automate an interactive quality control inspection process. A query module 402, for example, may be configured to query a user for a response to an audit question. As discussed above, an audit question may be directed to information relevant to a quality control inspection process, including HACCP compliance information, SOPP compliance information, sanitation information, time and temperature information, and/or any other such information known to those in the art.

In certain embodiments, an audit 200 may optionally further include an education module 404 to provide training information to an authorized user. Training information may provide instructions and/or information with respect to the audit question, criteria used to determine compliance, corrective action needed to resolve the failure to satisfy the criteria of the audit question, and the like. The present invention thus enables even a novice user to obtain quick and accurate responses to audit questions, and to efficiently interpret and apply audit results.

A storage module 406 may store responses to audit questions in a storage device under the exclusive control of the user. In certain embodiments, the storage module 406 may encrypt the responses or provide other data security protections for the responses. In this manner, the responses remain confidential and secure. As discussed previously, this feature of the present invention facilitates data integrity by restricting access to sensitive information to a user in physical possession of the storage device within the apparatus 100.

A determination module 408 may determine, based on the response, compliance with predetermined quality control criteria, including for example, HACCP compliance criteria, SOPP compliance criteria, and other criteria known to those in the art. Specifically, the determination module 408 may compare the value of the response to the predetermined quality control criteria to determine compliance. The criteria may require the response to fall above a threshold, below a threshold, or within an acceptable range. Alternatively, the criteria may require the response to match a boolean value such as true, false, yes, no, etc. Typically, the criteria is closely related to the audit question.

In certain embodiments, failure to satisfy or comply with the predetermined quality control criteria mandates a corrective action prior to completing the specific audit 200. Specifically, in some embodiments, a correction module 410 may condition completion of the audit 200 on completion of the corrective action, as discussed in more detail with reference to FIG. 6 below.

In other embodiments, a termination module 412 may terminate the interactive quality control inspection process where the responses repeatedly fail to comply with the predetermined quality control criteria for a predetermined number of audit questions. For example, where a particular industry fails the first three audit questions of the compliance inspection audit 202, the inspection process may be involuntarily terminated to maximize use of inspectors time as well as promote industry efficiency. Indeed, an inspector or other authorized user may proceed with an alternate inspection process while the subject industry proceeds to correct known and anticipated failures prior to re-inspection.

In some embodiments, and as discussed in more detail with reference to FIG. 7 below, an audit 402 may further include a reporting module 414 configured to rate a response and to assess overall industry compliance based on such ratings. In some embodiments, the report may categorize each audit question as critical or non-critical, according to its relative significance in overall audit 200 compliance. In other embodiments, the report may indicate a rating, point value, demerit, and/or other assessment known to those in the art associated with each particular audit question, as well as provide an assessment of overall industry compliance.

An access control module 416 may restrict access to the response and/or the predetermined quality control criteria, and in some embodiments, to the ratings generated by the reporting module 414, to authorized users according to access rights. Access rights may vary depending on the user's relationship with the particular industry as well as the sensitivity of the particular data. In one embodiment, for example, highest level access rights may provide a user with the ability to access and modify data relevant to any apparatus 100 function, while lowest level access rights may define a subset of apparatus 100 functions accessible by the user and limit access capabilities to read-only or print-only. The access control module 416 thus maximizes data integrity by limiting access to sensitive information to authorized users according to preassigned access rights. This feature, in addition to the user-exclusive storage module 406 that keeps certain data local to the apparatus 100 as discussed above, virtually ensures data security and privacy.

As previously mentioned, a facility performance function 208 may communicate with a sanitation device 220 adapted to detect and evaluate the presence of biological material and other sanitary conditions. FIG. 5 illustrates a method 500 for determining a facility's performance by completing the facility performance audit 208. Initially, an authorized user uses the sanitation device 220 to collect 502, via a swab or other collection device known to those in the art, a sample from a control point. The control point may be a cutting board, a counter surface, an employee's hands, a sink, a mixer blade, or other control point known to those in the art. In certain embodiments, the sanitation device 220 may then calculate 504 a point value or assign a rating corresponding to the sample. Alternatively, the sanitation device 220 may generate a raw data value that may be provided to the facility performance function 208. As discussed below, the facility performance function 208 may then calculate the point value or rating for the sample based on proprietary logic stored therein.

In one embodiment, the sanitation device 220 tests for the concentration of ATP in the sample by virtue of a swab or other collection device known to those in the art. As mentioned above with respect to FIG. 2, ATP is the universal energy molecule in biological systems. To detect the presence of ATP in a collected sample as contemplated by the present invention, the sanitation device 220 may add the enzyme luciferase to the sample to initiate a reaction specific to ATP. In an ATP-containing substance, luciferase substantially simultaneously hydrolyzes ATP to adenosine monophosphate ("AMP") and generates light. As almost every molecule of ATP hydrolyzed by this reaction generates one photon of green light, an amount of ATP present in the sample may be determined according to its resulting bioluminescence. The sanitation device 220 may thus provide a useful measure of surface cleanliness and hygiene.

Where prior art sanitation systems are generally limited to sweeping categorical assessments of hygiene such as, for example, pass/fail, some embodiments of the sanitation device 220 include proprietary logic capable of precisely assessing relative hygiene of a particular control point according to a multi-step process. Specifically, the sanitation device 220 may first obtain a numerical reading of bioluminescence from material swabbed or otherwise obtained from a specific control point. This numerical reading may then be transmitted to the facility performance function 208 by way of a secure, short distance connection.

Next, the facility performance audit 208 may identify 506 variables relevant to the particular control point sampled. Variables are factors that impact the reading provided by the sanitation device 220. Examples of variables may include the presence of additional known substances such as milk, detergent, or soap, a temperature of the surface, a time when the sample was taken, and/or other applicable variable information known to those in the art. In some embodiments, the facility performance function 208 may identify such variables by presenting one or more relevant audit questions.

The facility performance function 208 may then calculate 508 a point value or assign a rating to the sample based on a relative influence of each identified variable 506, causing the initial value or rating assigned to the variable 506 to be adjusted up or down. In certain embodiments, the facility performance function 208 references predefined point values or ratings and assigns these to each identified variable. The facility performance function 208 may then cumulate 510 the point values and/or ratings to adjust the ATP reading based on the identified applicable variables to generate an overall point value or rating for the sample. The resulting overall point value or rating may then be correlated 512 with a predetermined scale that indicates precise relative sanitation of the sample.

In one embodiment, for example, the predetermined scale may include ranges for a precise overall point value or rating. Depending on the range in which the overall point value or rating is included, the relative sanitary state of the sample may be classified as "Sanitary," "Acceptable," "Needs Attention," or "Over the Limit." In certain embodiments, classification of the overall point value or rating in either of the "Needs Attention" or "Over the Limit" categories may require corrective action, as discussed in more detail below.

Figure 6:
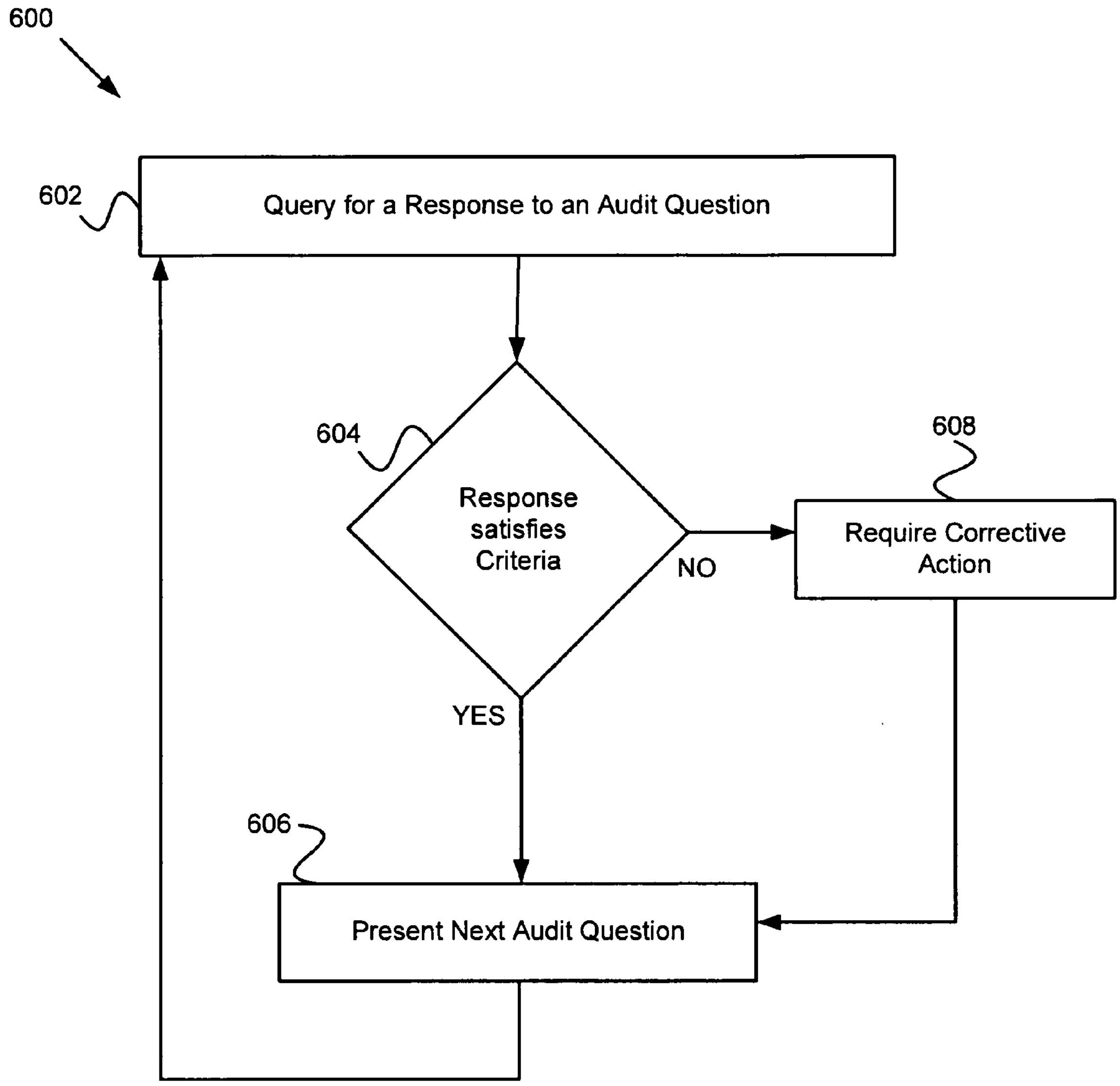
FIG. 6 is a flow chart diagram illustrating one embodiment of a method for requiring a corrective action in accordance with certain embodiments of the present invention.

Each audit 200 may incorporate a correction module 410 to require corrective action where a response to an audit question does not comply with the predetermined quality control criteria. FIG. 6 illustrates a method 600 for requiring a corrective action before continuing an audit 200. In certain embodiments, the correction module 410 may require corrective action by conditioning continuation of the inspection process on prior completion of the corrective action. Initially, the query module 402 presents an audit question to query 602 a user for a response. In one embodiment, the storage module 406 may then store the response. Next, the determination module 408 determines 604 whether the response satisfies the quality control criteria associated with this audit question. If so, the method 600 continues and the query module 402 presents 606 the next audit question. If not, the correction module 410 requires 608 a corrective action to be taken. In certain embodiments, the correction module 410 cooperates with the education module 404 to present training and help information describing the corrective action that is required based on the associated audit question.

Alternatively, the correction module 410 may permit the audit 200 to continue to the next audit question as long as the user meets override requirements. Override requirements may simply require that the user have certain authorization rights. Alternatively, the override may require a code and an explanation why the override is occurring. Alternatively, an override may be allowed with only an explanation for a failure to complete the corrective action. In one embodiment, the explanation may be provided as a memo corresponding to the failed audit question. In other embodiments, the explanation may be provided as a photograph, illustration, or other means of explanation known to those in the art. In one embodiment, the explanation may require entry of a re-inspection date that is scheduled for conducting a follow-up audit 200. Such an override feature may be useful, for example, where the authorized user is a government inspector or other third-party inspector having no personal relationship with the particular industry.

Figure 7:
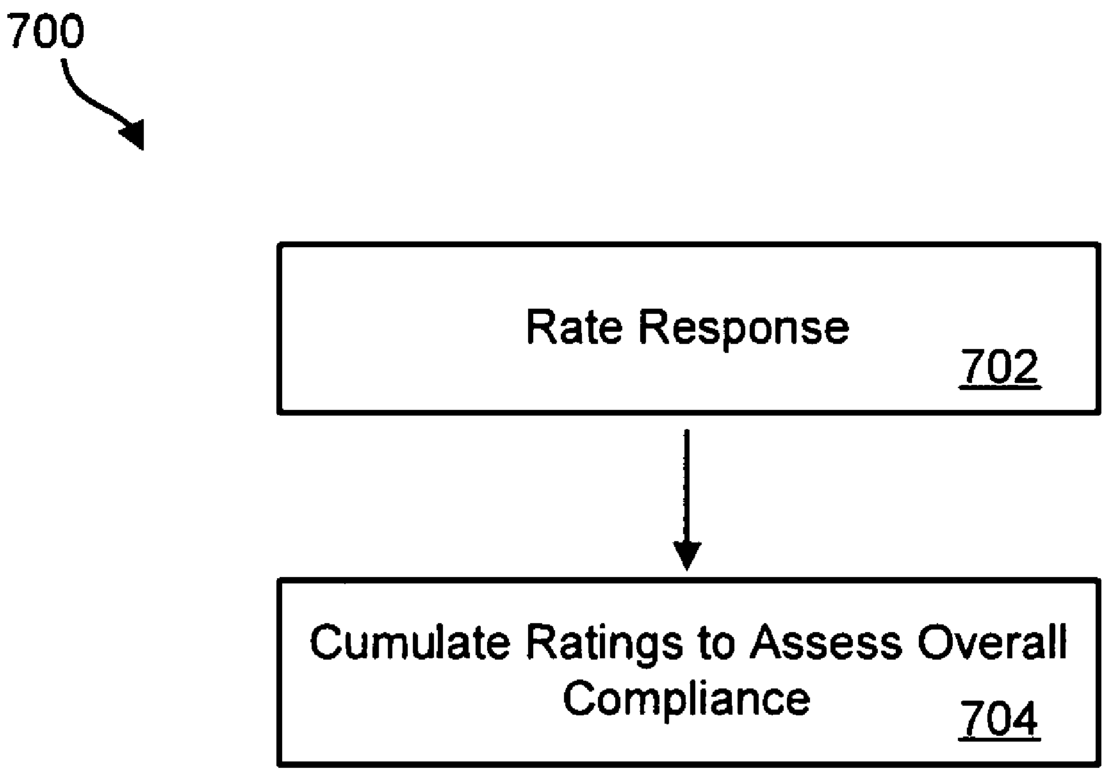
FIG. 7 is a schematic block diagram illustrating one embodiment of a reporting module in accordance with certain embodiments of the present invention.

Referring now to FIG. 7, each audit 200 may cooperate with the reporting module 414 to rate a response received in answer to an audit question. In one embodiment of a method 700 for reporting the results of an audit 200, each audit question includes an associated rating or point value. The reporting module 414 rates 702 each response. Once an audit 200 is complete, or during the audit 200, the reporting module 414 cumulates 704 multiple ratings for each completed audit question to assess overall compliance with the predetermined quality control criteria. Based on the audit question, each response may receive a different or similar point value or rating. For example, in one embodiment, a non-compliant response may receive a "0" point value, while a compliant response may receive a "1" point value. Alternatively, a non-compliant response may receive a negative rating such as a demerit, explained below.

Point values may be adjusted, in some cases, depending on a relevant performance history. For example, if a response to a particular audit question fails to comply with the predetermined quality control criteria for a certain number of times, for example three or more successive audits 200, the response rating may be reduced by a predetermined point value or rating, known as a demerit. In the foregoing example, a demerit may comprise a point value of "−1." Further, in certain embodiments, a point value or rating corresponding to a particular response may be reduced or enhanced depending on the relative seriousness of the failure to comply. For example, failure to comply with employee hand washing procedures in a food service establishment may reduce the assigned point value or rating by, for example, a "−2," whereas failure to comply with a policy to keep all drawers closed when not in use may affect the assigned point value by, for example, a "−1." As in the facility performance function 208 discussed above, the resulting overall point value or rating may be correlated with a predetermined scale to assess overall compliance with the predetermined quality control criteria. For example, the scale may be a grade scale of A-F, where A is a high positive rating and F is a low, unsatisfactory rating.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for automating an interactive quality control inspection process, comprising:

a processor; and a memory device configured to store executable and operational data, the memory device comprising, a query module configured to query a user for a response to at least one audit question;

a storage module configured to store the response in a storage device under the exclusive control of the user;

a determination module configured to determine, based on the response, compliance with predetermined quality control criteria; and an access control module configured to restrict access to at least one of the response and the predetermined quality control criteria to authorized users according to access rights.

2. The apparatus of claim 1, further comprising a correction module configured to require a corrective action where the response does not comply with the predetermined quality control criteria, and to selectively query the user for a response to a next audit question in response to completion of the corrective action.

3. The apparatus of claim 1, further comprising a sanitation module configured to detect and analyze a sanitary sample corresponding to a control point to generate the response.

4. The apparatus of claim 3, wherein the sanitation module is further configured to identify at least one variable corresponding to the sanitary sample and adjust the response to reflect the variable.

5. The apparatus of claim 1, further comprising a reporting module configured to rate the response and to cumulate a plurality of ratings to assess overall compliance with the predetermined quality control criteria.

6. The apparatus of claim 1, further comprising a termination module configured to terminate the interactive quality control inspection process where the response repeatedly fails to comply with the predetermined quality control criteria for a predetermined number of audit questions.

7. The apparatus of claim 2, further comprising an education module configured to present training information to the user with respect to at least one of the audit question, the predetermined quality control criteria, and the corrective action.

8. The apparatus of claim 1, wherein the audit question comprises at least one of a regulatory compliance question and a standard operating procedures compliance question.

9. The apparatus of claim 1, wherein the query module is configured to dynamically modify the audit question in response to administrator input.

10. The apparatus of claim 1, wherein the determination module is further configured to selectively modify the predetermined quality control criteria to reflect updated quality control criteria.

11. A system for automating an interactive quality control inspection process, the system comprising:

a sanitation device adapted to detect and analyze at least one of biological material and other sanitary conditions to generate information; and a portable audit device in communication with the sanitation device, the portable audit device comprising a processor and a memory device configured to store executable and operational data, the memory device comprising:

a query module configured to query a user for a response to at least one audit question, the response comprising the information;

a storage module configured to store the response in a storage device under the exclusive control of the user;

a determination module configured to determine, based on the response, compliance with predetermined quality control criteria; and an access control module configured to restrict access to at least one of the response and the predetermined quality control criteria to authorized users according to access rights.

12. The system of claim 11, further comprising a correction module configured to require a corrective action where the response does not comply with the predetermined quality control criteria, and to selectively query the user for a response to a next audit question in response to completion of the corrective action.

13. The system of claim 11, further comprising a reporting module configured to rate the response and to cumulate a plurality of ratings to assess overall compliance with the predetermined quality control criteria.

14. The system of claim 11, further comprising a termination module configured to terminate the interactive quality control inspection process where the response repeatedly fails to comply with the predetermined quality control criteria for a predetermined number of audit questions.

15. The system of claim 12, further comprising an education module configured to present training information to the user with respect to at least one of the audit question, the predetermined quality control criteria, and the corrective action.

16. The system of claim 11, wherein the audit question comprises at least one of a regulatory compliance question and a standard operating procedures compliance question.

17. A computer readable medium tangibly encoded with a program of machine-readable instructions to perform operations when executed by a computer processor to automate an interactive quality control inspection process, the operations comprising:

querying, via a portable audit device, a user for a response to an audit question of a quality control inspection process;

storing the response in a storage device under the exclusive control of the user;

determining, based on the response, compliance with predetermined quality control criteria;

restricting access to at least one of the response and the predetermined quality control criteria to authorized users according to access rights; and outputting an audit result, the audit result indicating whether or not the response complied with the predetermined ciuality control criteria.

18. The computer readable medium of claim 17, the operations further comprising:

requiring a corrective action where the response does not comply with the predetermined quality control criteria; and selectively querying the user for a response to a next audit question in response to completion of the corrective action.

19. The computer readable medium of claim 17, the operations further comprising analyzing, via a sanitation device, at least one of biological material and other sanitary conditions to generate the response.

20. The computer readable medium of claim 17, the operations further comprising:

rating the response; and cumulating a plurality of ratings to assess overall compliance with the predetermined quality control criteria.

21. The computer readable medium of claim 17, the operations further comprising terminating the interactive quality control inspection process where the response repeatedly fails to comply with the predetermined quality control criteria for a predetermined number of audit questions.

22. The computer readable medium of claim 17, the operations further comprising presenting training information to the user with respect to at least one of the audit question, the predetermined quality control criteria, and the corrective action.

23. An apparatus for automating an interactive quality control inspection process for a food service establishment, comprising:

a processor; and a memory device configured to store executable and operational data, the memory device comprising, a query module configured to query a user for a response to at least one food safety audit question;

a storage module configured to store the response in a storage device under the exclusive control of the user;

a determination module configured to determine, based on the response, compliance with predetermined food safety control criteria;

a reporting module configured to rate the response and cumulate a plurality of ratings to assess overall compliance with the predetermined food safety control criteria; and an access control module configured to restrict access to at least one of the response and the predetermined food safety control criteria to authorized users according to access rights.

24. The apparatus of claim 23, further comprising a correction module configured to require a corrective action where the response does not comply with the predetermined food safety control criteria and selectively query the user for a response to a next food safety audit question in response to completion of the corrective action.

* * * * *